(12) United States Patent
Wood et al.

(10) Patent No.: US 8,985,053 B2
(45) Date of Patent: Mar. 24, 2015

(54) FEEDER

(75) Inventors: Matthew John Wood, Herne Bay (GB); Graham Charles Evans, Canterbury (GB)

(73) Assignee: Graham Evans, Canterbury, Kent (GB)

( * ) Notice: Subject to any disclaimer, the term of this patent is extended or adjusted under 35 U.S.C. 154(b) by 572 days.

(21) Appl. No.: 12/164,399

(22) Filed: Jun. 30, 2008

(65) Prior Publication Data
US 2009/0020075 A1    Jan. 22, 2009

(30) Foreign Application Priority Data
Jul. 16, 2007   (GB) .................................. 0713658.3

(51) Int. Cl.
*A01K 61/02*    (2006.01)
*A01K 39/012*   (2006.01)

(52) U.S. Cl.
CPC .................................. *A01K 39/012* (2013.01)
USPC ........................................................ 119/57.8

(58) Field of Classification Search
CPC ..................................................... A01K 39/012
USPC ............................ 119/52.2, 52.3, 57.8, 57.9
See application file for complete search history.

(56) References Cited

U.S. PATENT DOCUMENTS

| | | | |
|---|---|---|---|
| 2,884,899 A * | 5/1959 | Jackes et al. ..................... | 119/53 |
| 4,636,061 A | 1/1987 | Staude et al. | |
| 5,044,319 A * | 9/1991 | Blasbalg ...................... | 119/57.9 |
| 5,063,877 A | 11/1991 | Riggi | |
| 5,360,138 A | 11/1994 | Zeller | |
| 5,709,165 A * | 1/1998 | Nurmikko .................. | 119/51.01 |
| 5,829,383 A * | 11/1998 | Blanding ..................... | 119/52.3 |
| 6,024,049 A * | 2/2000 | Price ............................. | 119/57.9 |
| 6,360,690 B1 * | 3/2002 | Canby .......................... | 119/52.2 |
| 6,863,024 B1 * | 3/2005 | Obenshain ................... | 119/57.8 |
| 7,448,346 B1 * | 11/2008 | Stone et al. .................. | 119/52.3 |
| 7,827,936 B1 * | 11/2010 | Puckett et al. ............... | 119/57.8 |
| 2003/0150391 A1 | 8/2003 | Rich | |

OTHER PUBLICATIONS

International Search Report for Great Britain Patent Application No. GB0713658.3, UKIPO, Nov. 6, 2007, 2 pages.

* cited by examiner

*Primary Examiner* — Timothy D Collins
*Assistant Examiner* — Joshua Huson
(74) *Attorney, Agent, or Firm* — Fay Sharpe LLP

(57) ABSTRACT

A feeder comprising an elongate receptacle for food; a removable part; and an elongate restraining pin positioned within the feeder. The direction of elongation of the elongate restraining pin is parallel to that of the feeder. When in an engaged position, the elongate restraining pin is engaged with the removable part so as to couple the removable part to the feeder, and, in a retracted position, is disengaged with the removable part as to uncouple the removable part from the feeder.

8 Claims, 1 Drawing Sheet

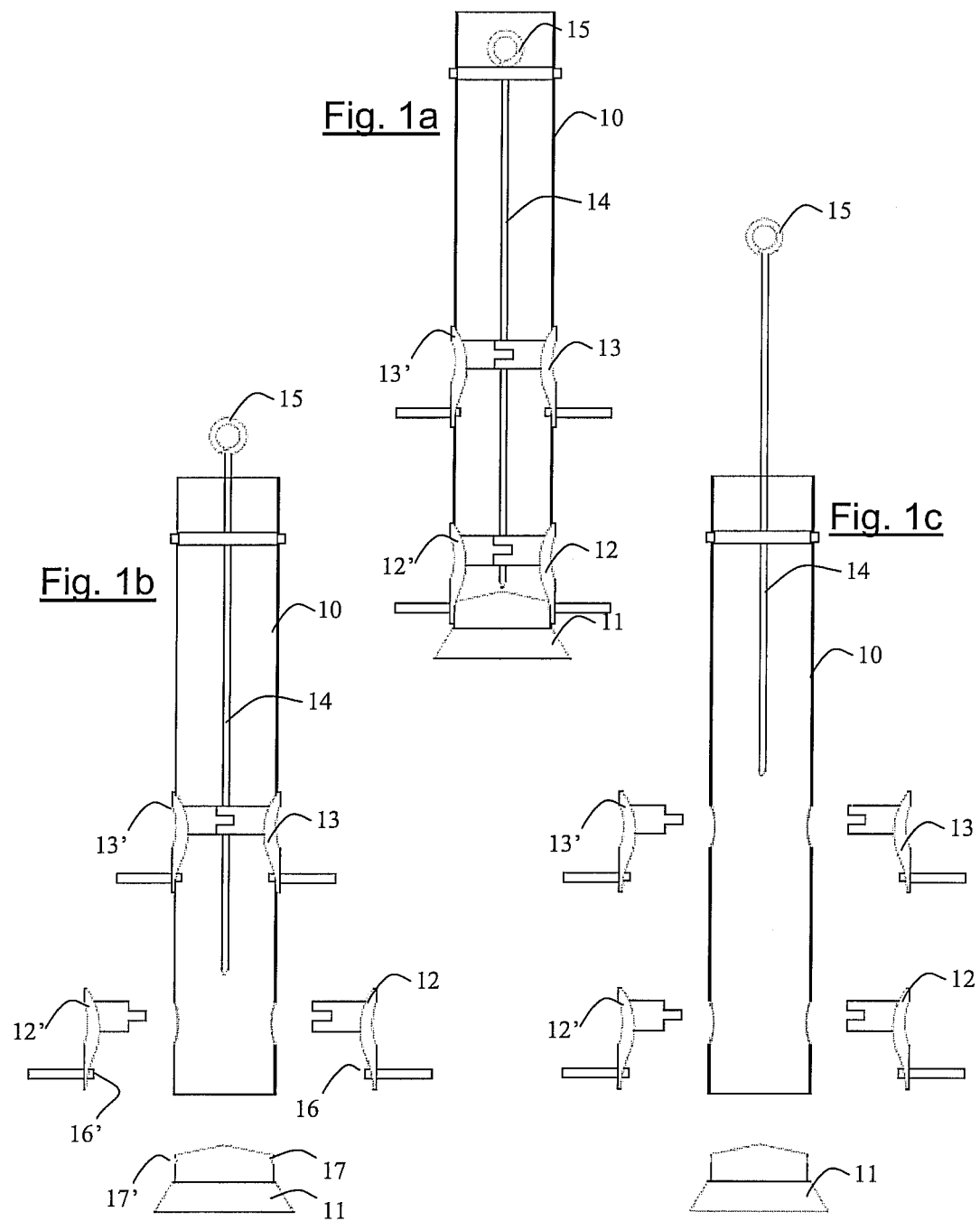

FEEDER

PRIORITY INFORMATION

The present application claims priority to Great Britain Patent Application No. 0713658.3, filed on Jul. 16, 2007, all of which is incorporated herein in its entirety.

BACKGROUND OF THE INVENTION

This invention relates to a feeder for an animal, especially a bird, having a receptacle for feed.

Bird feeders are of course known and, at the time of writing, a large selection can be purchased from Jacobi Jayne & Co (www.jacobijayne.co.uk).

SUMMARY OF INVENTION

In accordance with the present invention, there is provided a feeder comprising an elongate receptacle for food; a removable part; and an elongate retractable member positioned within the feeder whereby the direction of elongation of the retractable member is parallel to that of the feeder, wherein, in an engaged position, the retractable member is engaged with the removable part so as to couple the removable part to the feeder, and, in a retracted position, is disengaged with the removable part as to uncouple the removable part from the feeder.

Further in accordance with the present invention, there is provided a feeder comprising a receptacle for food; a removable part; and a retractable member, wherein, in an engaged position, the retractable member is engaged with the removable part so as to couple the removable part to the feeder, and, in a retracted position, is disengaged with the removable part as to uncouple the removable part from the feeder; and wherein the retractable part is one of either a perch, a port or a base or port with an integral perch.

The inventor has realised that bird feeders are not routinely cleaned because they are either inaccessible for cleaning or require any tools such as screw drivers or the like to dissemble the feeder for access to the receptacle for cleaning. A feeder according to the present invention has a removable part which may be removed for access to the receptacle for cleaning by disengaging a retractable part and, ideally, by hand from external to the feeder without requiring any tools.

BRIEF DESCRIPTION OF DRAWINGS

The invention will now be described, by way of example only.

FIG. 1a shows, schematically, a bird feeder according to the present invention; and FIGS. 1b and 1c show an exploded view of a bird feeder.

DETAILED DESCRIPTION OF THE INVENTION

Referring to FIG. 1a, a feeder according to the present invention is shown comprising a receptacle 10 to which is removably coupled a base 11, a pair of lower ports 12, 12' and a pair of upper ports 13, 13'. Each port has connected to it a corresponding perch. In an engaged position, both pairs of ports are coupled to each other inside the receptacle by an elongate restraining pin 14.

Referring to FIGS. 1b and 1c, the restraining pin 14 is illustrated being retracted. This can be done by hand including by a user (not shown) pulling the loop 15 at one end of the pin 14 from external to the feeder. A hook, "L" or other shape may be used as an alternative to the loop. When retracted, the pin no longer couples the pairs of lower ports 12, 12' and upper ports 13, 13' whereby they can be disconnected from the feeder.

Furthermore, uncoupling of the lower ports 12, 12' causes protrusion 16, 16' on the lower ports 12, 12' to egress from corresponding recesses 17, 17' on the base 11, thereby allowing the base to be uncoupled from the feeder.

Such disassembly facilitates cleaning without requiring a user to dissemble the feeder with any special tools.

We claim that:

1. A bird feeder comprising:
an elongate receptacle for food;
first and second removable parts each comprising a perch and a port, insertable through respective first and second apertures in a wall of said receptacle; and directly engageable with one another within the receptacle by an engagement assembly comprising complementary interlocking portions on said first and second removable parts; and
an elongate restraining pin positioned within the receptacle whereby the direction of elongation of the elongate restraining pin is parallel to that of the receptacle, said restraining pin being axially insertable into said receptacle from one end thereof to directly engage and couple together said first and second removable parts within said receptacle and thereby to couple the removable parts to the feeder, and retractable from the receptacle to release the first and second removable parts;
wherein, in an engaged position, the elongate restraining pin is engaged with said interlocking portions of the first and second removable parts so as to couple them together and thereby couple the removable parts to the feeder, and, in a retracted position, is disengaged from the first and second removable parts so as to uncouple them from one another and from the feeder for radially removing the first and second removable parts through said respective first and second apertures in the elongate receptacle for food, and
wherein the elongate restraining pin is engaged and disengaged by respectively axially inserting and retracting the elongate restraining pin by hand from outside the feeder.

2. A feeder according to claim 1 wherein the elongate restraining pin comprises a hook or a loop at one end.

3. A feeder according to claim 2 wherein, in the engaged position, the hook or loop is located in a recess of the feeder.

4. A feeder according to claim 1, wherein the first removable part and the second removable part form a first pair of removable ports, further comprising a second pair of removable ports, wherein, in the engaged position, the elongate restraining pin is engaged with the first and second pairs of removable ports inside the elongate receptacle for food.

5. A feeder according to claim 4 further comprising a base; and wherein, in the engaged position, the first pair of removable ports are engaged with the base so as to couple the base to the feeder.

6. A feeder according to claim 1 wherein the elongate restraining pin is non-threaded.

7. A feeder as claimed in claim 1, wherein said perch and port are integrally formed with one another.

8. A feeder as claimed in claim 1 wherein said first and second apertures through which said first and second removable parts are inserted are located opposite one another.

* * * * *